2,813,765
Patented Nov. 19, 1957

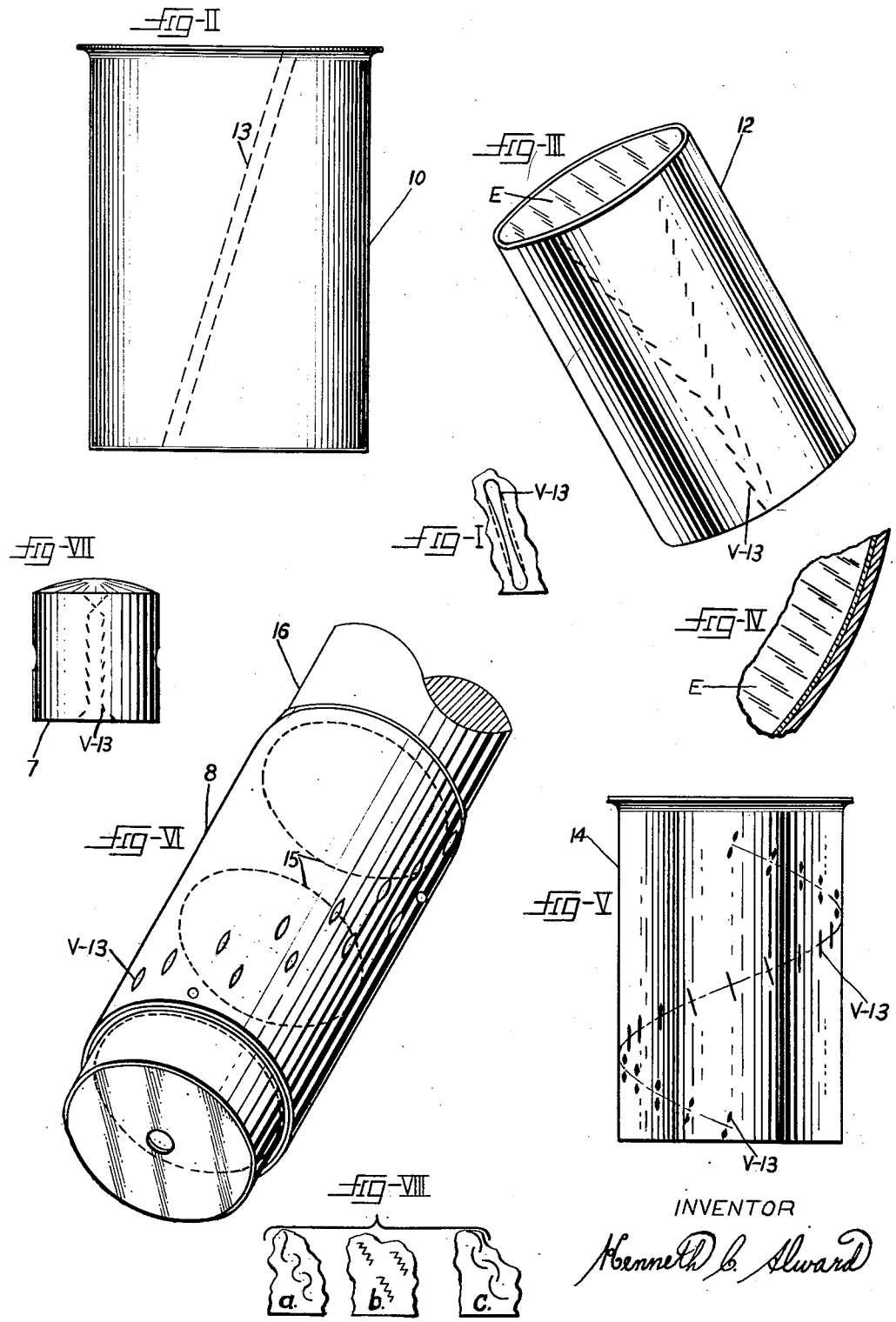

2,813,765
CYLINDRICAL CONSTRUCTION

Kenneth C. Alward, Moweaqua, Ill.

Application April 13, 1953, Serial No. 348,531

20 Claims. (Cl. 309—3)

This invention relates to cylinder sleeves and for a principal object has the aim of providing a novel surface member for internal and/or external machine areas which are subject to wear or deterioration and therefore in contemplation not only of the need of replacement but also in view of the known fact that the assembly of cylinder liner, rings and piston combination do provide much improved service over cast iron. Either the factor of hardness or the freedom from porosity in which sleeve surfaces do not allow abrasive particles to become embedded, such as cast iron allows, accounts for better serviceability.

A high regard and a welcome adaptation of a dry liner for cylinder bores has arisen, thus following the practice of inserting bushings for bearing surface. Annular liners for bores of auto engines, being thick, were inserted with a forced fit. Then, a distinct preference and improvement came to fore to insert a relatively thin steel sleeve even tho same would withstand less pressing, and thereupon, to rely upon extreme precision and/or close tolerance to obtain close union of surfaces.

In the invention, diametrical or circumferential tolerance, which is the more difficult dimensional problem, has herein been given great leeway and freedom. Exactitude need only to be emphasized in regard to the thickness of the sleeve wall. Wherein tubular sleeves require a tolerance of .0005 inch, the unique sleeves hereof may vary up to .005 in. on the diameter (being 10 times), due to compressibility and elasticity of same. Heat transfer is assured by a snug springy fit, whereas further trouble and manufacturing cost are greatly saved.

Even though the accepted modern dry sleeve has been received by industry and by the public with marked success, same has revealed shortcomings apropos of a long felt want to provide elasticity in such type of sleeve.

One object of the invention is to arrange the construction of a sleeve such that, whenever desirable, resistance to compressibility or expansion, as the case may be, will vary along the sleeve from entrance relief to strenuous seating extremity.

Another object is to arrange vacancies in the lateral structure such that said vacancies will afford a slanted relationship to a moving member.

And again an object is to provide enamel surfacing more impervious to the usual absorption of heat in a cylinder sleeve capable of leeway in peripheral precision.

Then a further object is to provide devious arrangements which will result in circumferential resilient stresses in accordance with the service to be performed.

An additional object is to maintain adequate strength for an expansile sleeve by positioning slots out of alignment.

A still further object is to apply, with versatile scope, the adaptation to surface external members both distensible or contractile and with one or both ends closed.

These and other objects and broadening advantages will become manifest upon scrutiny of the ensuing disclosure.

Identification of the drawings:

Fig. I is an enlarged diagrammatic view of a representative slot or vacancy, showing both static and compressed shapes of a typical slot.

Fig. II is an elevational view of a cylinder having parallel alternating and interrupted slots in series alignment.

Fig. III is a perspective view of a tubular member having one bonded surface or vitreous enamel also featuring diverging slits with asymmetrically positioned clefts to achieve gradient tentional discrepancy in circumferential stress.

Fig. IV is a fragmentary section of an enamel coated cylinder, showing metal bonded with an enamel coating.

Fig. V is an elevational view of a cylinder having offset vacancies distributed spirally along and around the tube and showing a guide line in the form of a sine curve.

Fig. VI is a perspective view of a distensible sleeve stretched and externally slipped over a shaft to become fixed thereon as a friction surface member.

Fig. VII is an elevational view of a compressible hollow tubular construction having one closed end and offset relieving spaces allocated in alternating sequence.

Fig. VIII is a diagrammatic view showing various shapes which the opening gaps may form.

The invention may be best understood by reference to the drawings. It is revealed by Fig. I that the gaps V–13 become partially closed showing that there has been a relieving yieldment in this slot-gap; whereas, in case of a stretched external sleeve a recessive outline would occur rather than the protruding shape or vice versa.

Referring now to Fig. II a cylinder 10 is shown which exhibits a plural series of interrupted slots 13 in which the slots of the next adjacent row are alternated such that they laterally flank adjacent struts which remain between consecutive slots. Such an arrangement provides vacancies which prevail along the entire length of the sleeve liner, for the total length of the gaps 13 will exceed the lengths of the liner since said respective slots 13 are each calculated to overextend the terminus of slots next adjacent thereto, which are in a row to the side thereof.

In the foregoing example cylinder 10, however, the resistance is equal thruout the full length upon insertion of the liner, even tho the "drag" is increased, from increased rough surfaces. Now, there is a benefit to be derived from having the liner effect an easy entrance, and thence thereafter, it is better that the circumferential pressure be gradiently increased from the bottom to the top. There will yet be had firm reliance on a definite void or skip in the liner wall which positively will allow resilient shrinkage of the circumference. In liner 12, Fig. III, such a result, i. e. a result of easy entrance into a receiving bore, and then, an easy fit increasing in stress to the extent of a snug cohesion has been arrived at by this explained expedient.

The offset slits V–13 at the lower end of 12 are close together which results in easy action. When the separation between slits V–13 is widened to increase the distance between same, the tension is increased as the sleeve approaches final seating position. Yet, the alignment of the clefts in 12 of Fig. III need not be straight or assume any definite course.

When, such as in an internal-combustion cylinder, the top is subjected to intense heat, increasing strength toward the top, such as in this 12 of Fig. III, is a feature point well heeded. Such are the inherently tolerant aspects of the type of sleeve herein depicted, that this improvement especially lends itself to the feasibility of an important advance in the art of cylinders for use in such as internal-combustion engines. The feature of heat-isolation for such cylinder liners has been regrettably unrecognized. The heat which is absorbed by the metal wall-surface of cylinders during the power stroke is not only wasteful but also detrimental to the operation of the engine, and the consequences of such heat—such as uneven and unpredictable expansion—aggravates the engineering problems thereof. I herefore disclaim any application other than to an internal-combustion engine.

Herein it is provided that a coating of lesser convectivity than metal be bonded to the interior of these especially adaptable cylinder liners. Heretofore, it has been impractical to so do because of the extreme rigidity of the plain tubular liner; such a steel liner would expand to the extent of cracking vitreous enamel—e. g. if fitted too loosely; and if too tight (such as a force fit) there is danger of cracking the enamel upon forcible insertion of the liner.

As herein shown in Figs. III and IV, enamel E is coated on the cylindrical surface in the usual manner of its application to metal surfaces. It is well to heed particular attention to enamel quality, such as to the heat-expansion resistance quartzlike formulas developed by the glass industry, which stand the test of having ice on one side and melted lead on the other. Precise surfacing may omit further finishing.

In Fig. V, to effect uniform distribution of the vacancies V–13, same are arranged on sleeve 14 in the manner of a sine curve spiral (indicated by sine guide line) around and along said 14. The lengths-sum of the respective cleft gaps add up to determine a complete longitudinal relieving vacancy. Otherwise, should the slots V–13 be not milled to overextend each other, then therefore, extra rigidity will be inherent in the sleeve. Even tho the sleeve is made oversize as for a force fit, said sleeve will yield resiliently thru slots V–13 and thenceforth exert a persistent springy cohesion to the bore, which is an extraordinary attribute for a sleeve due to this invention. Solidity remains at the extreme top of 14, which has an open slit at bottom for easy entrance in this example.

In Fig. VI the invention typifies the same general construction in the sleeve 8 except that said 8 is depicted as an externally applied sleeve and being pressed over shaft 16 by benefit of the continuing vacancies being supplied by the perforations V–13 in an exemplary sine curve distribution. It is an innovation in these expanded installations that the termini of V–13 are not consecutive each to the other thus retaining expansive strength to sleeve 8, as reserve strength against inaccurate calculation for undersize fit to shaft; and then, to prevent voids being too near the sleeve ends same is internally reamed at a slight taper, as those ends are cambered (usual practice anyhow) to relieve said ends. Thus, it should not be ordinarily necessary to undercut the shaft to form a deep seating locale for the sleeve 8.

The hidden lines 15 represent in an exaggerated manner the lesser inner circumference of the collar 8 before being elastically mounted. For localizing a collar previous art has oftimes necessitated a drill hole in the shaft containing a shouldered pin reposing in a hole in the collar and being urged by a spring. Said drill hole being a weak spot would often effect breakage of the shaft. Removal of a worn sleeve 8 could be effected by bursting same at gap points.

Fig. VII follows the invention type as a hollow tubular construction 7, modifying outlines for V–13 of this invention. As distinguished from the other hollow members, these embody an end closure or top cap. The layout hereof of V–13 is variant but performance thereof is analogous to the other examples.

The type of material used for 8, and also the others (7, 10, 12, and 14), could be reversed from the usual employment of ferrous metals for the male component of affiliated friction members inasmuch that bronze, brass, or coatings thereof of babbit or cadmium are applicable. Elastic and springy steels will generally be most favorable. Steels on the order of type SAE 1030 to 1040 are suitable for annealed cold working and then hardening by quench tempering. Where it is desirable to case-harden on one side, steels on the order of SAE 1015 or 1016 are satisfactory. Carburization is suitable with steels of the SAE 1020–24, 1320, 3310, 4032 calibre. The nitriding process may be used for hardening, but caution against surface distortion should be considered. Also, chromium plating of .0005 inch is a very popular method of surfacing steel cylinder sleeves.

The vacancies V–13 may take other peculiar shapes or punched perforations as alluded to in a, b, c, of Fig. VIII. Shapes, slants or representative locations are not necessarily controlling.

Modifications will occur to those skilled in the art. In retrospect thereof, no untoward limitations should be assumed in view of a detailed or a specified example predicated upon an intimate scrutiny of these explanations and merely typical representative embodiments.

I claim, therefore, as my invention:

1. A cylinder sleeve comprising a simple sequence of slim interrupted slots distributed along the said sleeve, the length of said slots being sufficient to overextend another slot which will be next adjacent thereto to provide the characteristic of reclaimable shrinkage of the circumference thereof without substantially reducing the wearing surface and sacrificing heat transfer when installed in a cylinder.

2. A sleeve according to claim 1 in which twin rows of alternate slender slots are parallel.

3. A cylinder sleeve as in claim 2 in which the slots thereof are aligned as a slant to the axis thereof.

4. A cylinder sleeve comprising a limited system of elongated slots with which flanking slots are supplemented to effect arithmetically a longitudinal interruption which is substantially less than universal in its distribution on the surface of the sleeve and thus permitting constriction of the circumference in liberalizing the tolerance of fit, and insuring a snug fit in a cylinder bore.

5. A cylinder as in claim 4 in which vitreous enamel and quartz-like enamel is the coating supplied in a special surfacing.

6. A sleeve as in claim 4 in which individual slots thereof depict a diversion from a straight line and exemplify a shape other than linear.

7. A sleeve according to claim 4 in which a simple sequence of slim slots is distributed in a helix arrangement from top to bottom of the sleeve.

8. In a cylinder sleeve which is in combination with a fixed cylinder, a continuous hollow construction comprising a consecutive series of slots in which the terminus of each slot overextends in projection the slot preceding same and also the slot succeeding same to the extent that the arithmetical sum of the length of the slots will exceed the distance between the respective slots at the top and at the bottom of the cylinder, and means for insulating the interior of said sleeve which has the characteristic of elasticity under stress.

9. A cylinder according to claim 8 in which the elastic stress is variant from the top to the bottom of said cylinder.

10. A sleeve according to claim 8 in which the slots are spirally distributed around the sleeve.

11. A cylinder as in claim 8 in which an external sleeve fits over a rigid cylindrical member.

12. A cylinder according to claim 8 in which vitric quartz is the insulating coating.

13. In a cylinder sleeve serving as a friction surface member to assume the wear otherwise borne by the cylinder body a twin pair of supplementary rows consisting of alternate interrupting vacant slits which by virtue of the skips thereof will allow the circumference of said sleeve to retract and yet be under stress which is urgent of said sleeve to reclaim the original size thereof.

14. A sleeve according to claim 13 in which a coating of quartz enamel is applied to the sleeve used in an internal-combustion engine.

15. In combination with the cylinder bore of an internal-combustion engine a cylinder sleeve comprising a restricted arrangement of interrupted and alternating slender skips, an interior coating of quartz composition which superlatively restricts the heat absorbing qualities of intense combustion, the said skips permitting perimetral diminution of said sleeve while retaining capability to exert expansible stress.

16. A sleeve according to claim 15 in which a variable separation exists between alternate slots which alters the springy tension of the sleeve in contact with the bore wall.

17. In a cylinder sleeve which is in combination with a fixed cylinder, a continuous hollow construction comprising a consecutive series of slots in which the terminus of each slot overextends in projection the slot preceding same and also the slot succeeding same to the extent that the arithmetical sum of the length of the slots will exceed the distance between the respective slots at the top and at the bottom of the cylinder.

18. A cylinder according to claim 17 in which the elastic stress is variant from the top to the bottom of said cylinder.

19. A sleeve according to claim 17 in which the slots are spirally distributed around the sleeve.

20. A cylinder according to claim 17 in which vitric quartz is the insulating coating.

References Cited in the file of this patent

UNITED STATES PATENTS

| | | |
|---|---|---|
| 70,707 | Emery | Nov. 12, 1867 |
| 813,536 | Thier | Feb. 27, 1906 |
| 1,442,706 | Smith | Jan. 16, 1923 |
| 1,971,433 | Tartrais | Aug. 28, 1934 |
| 2,170,015 | Ford | Aug. 22, 1939 |
| 2,283,424 | Colwell et al. | May 19, 1942 |
| 2,635,021 | Alward | Apr. 14, 1953 |